US012069568B2

(12) United States Patent
Baek et al.

(10) Patent No.: US 12,069,568 B2
(45) Date of Patent: *Aug. 20, 2024

(54) METHOD AND DEVICE FOR TERMINAL ATTACHING AND CREATING HOME-ROUTED PDU SESSION IN ROAMING ENVIRONMENT SUPPORTING NETWORK SLICE

(71) Applicant: Samsung Electronics Co., Ltd., Suwon-si (KR)

(72) Inventors: Youngkyo Baek, Seoul (KR); Sunghoon Kim, Seoul (KR); Jungje Son, Yongin-si (KR); Hoyeon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

This patent is subject to a terminal disclaimer.

(21) Appl. No.: 17/860,778

(22) Filed: Jul. 8, 2022

(65) Prior Publication Data

US 2022/0353797 A1    Nov. 3, 2022

Related U.S. Application Data

(63) Continuation of application No. 16/338,554, filed as application No. PCT/KR2017/011133 on Oct. 10, 2017, now Pat. No. 11,388,656.

(30) Foreign Application Priority Data

Oct. 6, 2016 (KR) .................. 10-2016-0129252

(51) Int. Cl.
*H04W 48/16* (2009.01)
*H04W 48/18* (2009.01)
*H04W 84/04* (2009.01)

(52) U.S. Cl.
CPC ........... *H04W 48/16* (2013.01); *H04W 48/18* (2013.01); *H04W 84/042* (2013.01)

(58) Field of Classification Search
CPC .... H04W 84/042; H04W 48/18; H04W 48/16
(Continued)

(56) References Cited

U.S. PATENT DOCUMENTS 11,388,656 B2 * 7/2022 Baek ................ H04W 48/16
2017/0303259 A1 * 10/2017 Lee ................. H04W 28/16

FOREIGN PATENT DOCUMENTS

KR        101631630 B1    6/2016
WO       2018038487 A1    3/2018

OTHER PUBLICATIONS

Indian Office Action dated Apr. 20, 2023, issued in Indian Application No. 201937013553.
(Continued)

*Primary Examiner* — Chuck Huynh
(74) *Attorney, Agent, or Firm* — Jefferson IP Law, LLP (57) ABSTRACT

The present disclosure relates to a 5G or pre-5G communication system for supporting a data transmission rate higher than that of a 4G communication system such as LTE. According to one embodiment of the present invention, a method in a roaming environment supporting a network slice is provided. The method comprises the steps of: receiving, from a terminal, a first packet data unit (PDU) session request message including slice assistance information indicating the properties of a service the terminal intends to use; transmitting, to a network function (NF) repository function, a first discovery request message including a home public land mobile network (PLMN) ID of the terminal and the slice assistance information; and receiving, from the NF repository function, a first discovery response message including a session management network
(Continued)

function (SM NF) address of the home PLMN. The SM NF is selected on the basis of the slice assistance information.

6 Claims, 10 Drawing Sheets (58) Field of Classification Search
USPC .......................................................... 370/328
See application file for complete search history.

(56) References Cited

OTHER PUBLICATIONS

Korean Office Action dated Oct. 25, 2022, issued in Korean Patent Application No. 10-2016-0129252.
3GPP TR; 23.799 V1.0.1, 3GPP; TSG SA; Study on Architecture for Next Generation System; (Release 14)', Sep. 28, 2016. (https://portal.3gpp.org/desktopmodules/Specifications/SpecificationDetails.aspx?specificationId=3008).
NTERDIGITAL; 'Modification of the Set of Selected Slices for a UE', S2-164540, SA WG2 Meeting #116BIS, Aug. 23, 2016, Sanya, China. (http://www.3gpp.org/ftp/tsg_sa/WG2_Arch/TSGS2_116BIS_Sanya/Docs/).
ERICSSON; 'Solution for selection of a network slice instance', S2-163338, SA WG2 Meeting #116, Jul. 5, 2016, AT, Vienna. (http://www.3gpp.org/ftp/tsg_sa/WG2_Arch/TSGS2_116_Vienna/Docs/).
Nokia, 'Slice Selection solution update', S2-162982, SA WG2 Meeting #115, May 27, 2016, Nanjing, P.R. China. (http://www.3gpp.org/ftp/tsg_sa/WG2_Arch/TSGS2_115_Nanjing_China/Docs/).
Qualcomm Incorporated, "Extensions and corrections to Solution 4.3 to key issue 4 on Multiple PDU sessions to the same Data Network", 3GPPDRAFT; S2-163183-163165-163119-162935-WAS-162343-NEXTGEN-SM_ V2, 3rd Generation Partnership Project (3GPP), Mobile Competence Centre; 650, Route Des Lucioles; F-06921 Sophiaantipolis Cedex; FR, vol. SA WG2, Nanjing, P.R. China; May 23, 2016-May 27, 2016, Jun. 1, 2016, XP051116665, Retrieved from the Internet: URL:http://www.3gpp.orglftp/tsg_sa/WG2_Arch/.
Samsung, "Home-routed PDU Session Request Procedure in roaming Network slicing support", 3GPP Draft; S2-165754_NETWORK Slicing Roaming_PDUSESSIONREQUEST, 3rd Generation Partnership Project (3GPP), Mobile Competence Centre; 650, Route Des Lucioles; F-06921 Sophiaantipolis Cedex; France, vol. SA WG2, Kaohsiung City, Taiwan; Oct. 17, 2016-Oct. 21, 2016, Oct. 16, 2016, XP051155337, Retrieved from the Internet: URL:http://www.3gpp.orglftp/Meetings_3GPP SYNC/SA2/00cs/, [retrieved on Oct. 16, 2016].
Partial European Search Report dated Jan. 13, 2020, issued in European Patent Application No. 17858771.3.
Qualcomm Incorporated et al., "TS 23.501: Slice co-existence and conflicting S-NSSAIs", 3GPP Draft; S2-173103-23.501—Slicing-Nssai-Coexistance V3, 3rd Generation Partnership Project (3GPP), Mobile Competence Centre; 650, Route Des Lucioles, F-06921 Sophia-Antipolis Cedex, France, vol. SA WG2, Hangzhou, P.R. China, May 15, 2017-May 19, 2017, May 9, 2017, XP051268573.
Huawei et al., "Supporting network slicing in roaming scenario", 3GPP Draft; S2-165385 Was S2-165261 Was S2-165189 Was S2-164511 Supporting Network Slicing in Roaming Scenario-Revise, 3rd Generation Partnership Project (3GPP), Mobile Competence Centre; 650, Route Des Lucioles, F-06921 Sophia-Antipolis Cedex, France, vol. SA WG2, Sanya, China, Aug. 29, 2016-Sep. 2, 2016, Sep. 3, 2016, XP051172143.
Zte et al., "Network Slicing Roaming Support (Based on Solution#2)", 3GPP Draft; S2-165386 Was 5241 Was 4700 Proposed Network Slicing Roaming Architecture, 3rd Generation Partnership Project (3GPP), Mobile Competence Centre; 650, Route Des Lucioles, F-06921 Sophia-Antipolis Cedex, France, vol. SA WG2, Sanya, China, Aug. 29, 2016-Sep. 2, 2016, Sep. 3, 2016, XP051169365.
Extended European Search Report dated May 20, 2020, issued in European Patent Application No. 17858771.3.

\* cited by examiner

METHOD AND DEVICE FOR TERMINAL ATTACHING AND CREATING HOME-ROUTED PDU SESSION IN ROAMING ENVIRONMENT SUPPORTING NETWORK SLICE

CROSS-REFERENCE TO RELATED APPLICATION(S)

This application is a continuation application of prior application Ser. No. 16/338,554, filed on Apr. 1, 2019, which application is a U.S. National Stage application under 35 U.S.C. § 371 of an International application number PCT/KR2017/011133, filed on Oct. 10, 2017, which is based on and claims priority under 35 U.S.C. § 119(a) of a Korean patent application number 10-2016-0129252, filed on Oct. 6, 2016, in the Korean Intellectual Property Office, the disclosure of which is incorporated by reference herein in its entirety.

TECHNICAL FIELD

The disclosure relates to a mobile communication system. Particularly, the disclosure relates to, when a terminal performs roaming to a network that supports a network slice, a method for the terminal to attach to the network and a method for the terminal to generate a packet data unit (PDU) session for providing home-routed traffic.

BACKGROUND ART

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system. In order to accomplish a higher data transfer rate, the implementation of the 5G communication system in a super-high frequency (mmWave) band (e.g., about a 60 GHz band) is being considered. Also, in order to obviate a propagation loss of a radio wave and increase a delivery distance of a radio wave in the super-high frequency band, discussions for the 5G communication system are underway about various techniques such as a beamforming, a massive MIMO, a full dimensional MIMO (FD-MIMO), an array antenna, an analog beam-forming, and a large scale antenna. Additionally, for an improvement in network of the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like. Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Meanwhile, one of new structural features of the 5G network is the introduction of network slicing technology for radio access network (RAN) and core network (CN) structures. The network slicing technology bundles network resources and network functions into one independent slice for each individual service. Using the network slicing technology makes it possible to apply attributes such as isolation, customization, or independent management and orchestration of network system functions and resources to a mobile communication network structure. Therefore, a network operator can independently allocate network resources specialized to each service and user, and can independently and flexibly provide services by selecting and combining network functions of the 5G system according to criteria such as service, user, and business model.

One of technical issues (work tasks) essential to the development of a network slicing structure is network slicing roaming support. The disclosure describes network functions required in a home network and a visited network in order to realize the network slicing roaming support, that is, in order to support roaming of a terminal (UE).

DISCLOSURE OF INVENTION

Technical Problem

The disclosure provides a method for a terminal to access an operator's network that supports a network slice.

The disclosure provides a method for connecting a terminal-subscribed mobile communication operator (i.e., a home network) and a mobile communication operator of a visited area (i.e., a visited network) when the terminal attaches to an operator's network supporting a network slice and receive a service in a mobile communication system.

The disclosure provides a method for generating a packet data unit (PDU) session for serving home-routed traffic to a roaming terminal.

Solution to Problem

According to an embodiment of the disclosure, provided is a method in a roaming environment that supports a network slice. The method includes receiving, from a terminal by a serving common control plane network function (serving CCNF), a first packet data unit (PDU) session request message containing slice assistance information indicating a characteristic of a service to be used by the terminal; transmitting, to a network function (NF) repository function, a first discovery request message containing an ID of a home public land mobile network (home PLMN) of the terminal and the slice assistance information; and receiving, from the NF repository function, a first discovery response message containing an address of a session management network function (SM NF) of the home PLMN. The SM NF of the home PLMN is selected from among SM NFs of a PLMN associated with the home PLMN ID, based on the home PLMN ID and the slice assistance information.

According to another embodiment of the disclosure, a common control plane network function (CCNF) of a visited public land mobile network (visited PLMN) is provided in a roaming environment that supports a network slice. The CCNF includes a transceiver transmitting and receiving signals to and from a terminal and a network function (NF) repository function; and a controller connected to the transceiver. The controller is configured to control the transceiver to receive, from the terminal, a first packet data unit (PDU) session request message containing slice assistance information indicating a characteristic of a service to be used by the terminal, to control the transceiver to transmit, to the NF repository function, a first discovery request message containing an ID of a home PLMN of the terminal and the slice assistance information, and to control the transceiver to receive, from the NF repository function, a first discovery response message containing an address of a session management network function (SM NF) of the home PLMN. The SM NF of the home PLMN is selected from among SM NFs of a PLMN associated with the home PLMN ID, based on the home PLMN ID and the slice assistance information.

According to still another embodiment of the disclosure, provided is a method for generating a home-routed packet data unit (PDU) session by a terminal in a roaming environment that supports a network slice. The method includes transmitting, to a common control plane network function (CCNF) of a visited public land mobile network (visited PLMN), a first PDU session request message containing slice assistance information indicating a characteristic of a service to be used by the terminal; and receiving, from the CCNF of the visited PLMN, a first PDU session response message containing an Internet protocol (IP) address of the terminal. The IP address of the terminal is acquired from a session management network function (SM NF) of a home PLMN in response to a third PDU session request message containing an ID of the terminal, and the SM NF of the home PLMN is selected from among SM NFs of a PLMN associated with a home PLMN ID, based on the home PLMN ID and the slice assistance information.

According to still another embodiment of the disclosure, a terminal is provided in a roaming environment that supports a network slice. The terminal includes a transceiver transmitting and receiving signals to and from a common control plane network function (CCNF) of a visited public land mobile network (visited PLMN); and a controller connected to the transceiver. The controller is configured to control the transceiver to transmit, to the CCNF of the visited PLMN, a first PDU session request message containing slice assistance information indicating a characteristic of a service to be used by the terminal, and control the transceiver to receive, from the CCNF of the visited PLMN, a first PDU session response message containing an Internet protocol (IP) address of the terminal. The IP address of the terminal is acquired from a session management network function (SM NF) of a home PLMN in response to a third PDU session request message containing an ID of the terminal, and the SM NF of the home PLMN is selected from among SM NFs of a PLMN associated with a home PLMN ID, based on the home PLMN ID and the slice assistance information.

Advantageous Effects of Invention

When a terminal desires to attach to other operator's network and receive a service in a roaming environment, it is possible to allocate a network slice capable of supporting the service and, through this, provide the service to the terminal.

When home-routed traffic is to be served, it is possible to generate a packet data unit (PDU) session to support a quality of service (QoS) suitable for a terminal and also efficiently operate radio resources and network resources.

MODE FOR THE INVENTION

Hereinafter, the disclosure will be described in detail with reference to the accompanying drawings. In the following description of the disclosure, a description of known functions or configurations incorporated herein may be omitted to avoid unnecessary obscuration of the disclosure. Terms used herein are defined in consideration of disclosed functions and may vary based on a user's or operator's intention or custom. Therefore, the definitions of terms should be made on the basis of the entire content of this disclosure.

In this disclosure, terms for identifying access nodes, terms for indicating network entities, terms for indicating messages, terms for indicating interfaces between network entities, terms for indicating various types of identification information, and the like are exemplary for convenience of description. Therefore, the disclosure is not limited to terms used herein, and other terms for indicating objects having equivalent technical meanings may be alternatively used.

Hereinafter, for convenience of description, the terms and names defined in the 3rd Generation Partnership Project Long Term Evolution (3GPP LTE) standard will be used. However, the disclosure is not limited to such terms and names, and may be equally applied to systems that comply with other standards.

Figure 1:
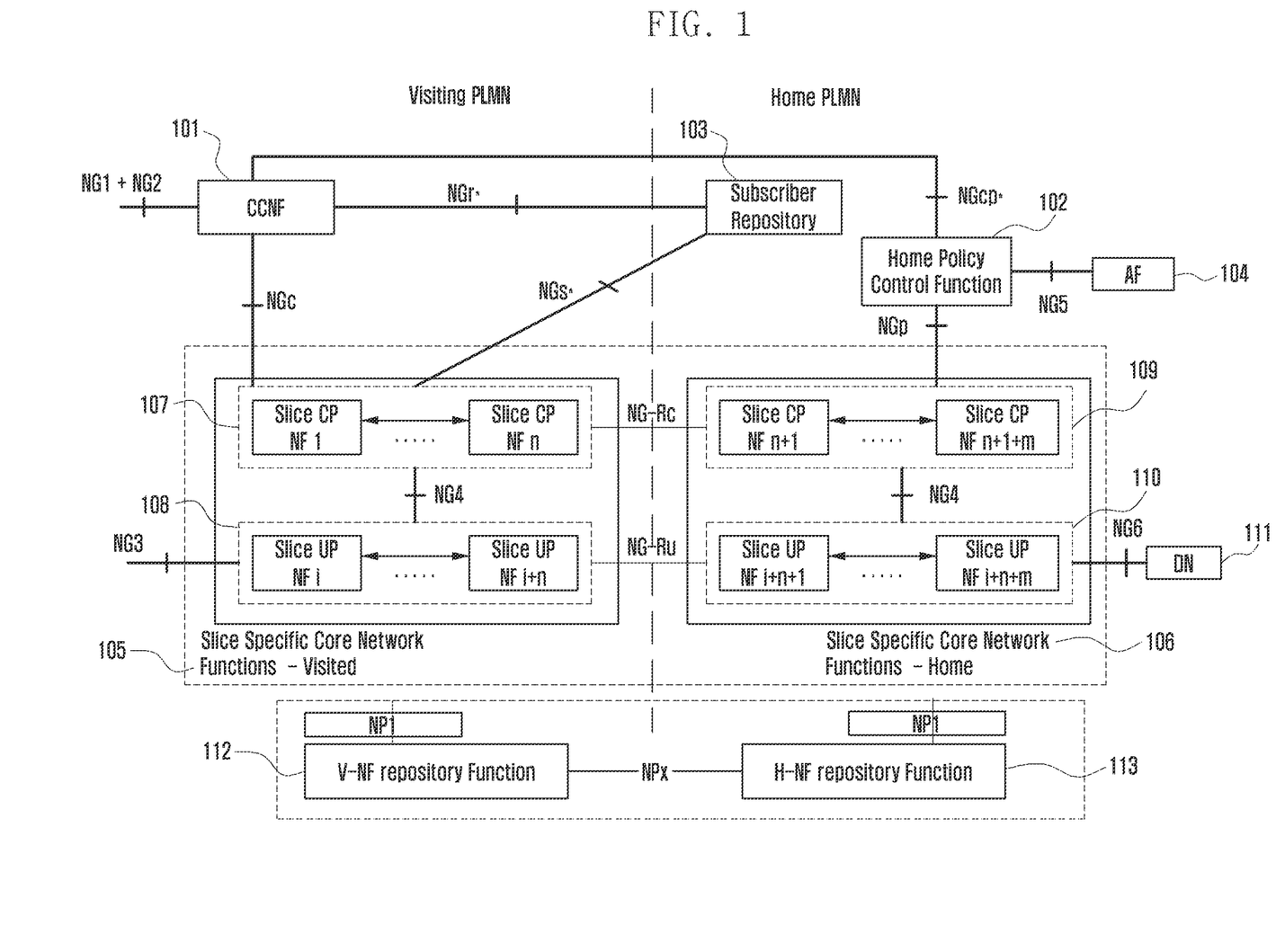
FIG. 1 illustrates an example of a core network architecture excluding a terminal and a base station in a network that supports roaming between wireless communication systems applying a network slice and also serves home-routed traffic.

FIG. 1 illustrates an example of a core network architecture excluding a terminal and a base station in a network that supports roaming between wireless communication systems applying a network slice and also serves home-routed traffic.

Referring to FIG. 1, a core network of a wireless communication system that supports a network slice is divided into a visited public land mobile network (PLMN) and a home PLMN.

The visited PLMN to which a roaming terminal will attach includes a common control plane network function (CCNF) 101 and a slice specific core network function 105 that collects network functions (NFs) related to a network slice. The slice specific core network function 105 includes slice specific control plane network functions (SSCNF) 107 including Slice CP NF_1, . . . , Slice CP NF_n which are control plane network functions defined to be used only within a network slice, and slice specific user plane network functions (SSUNF) 108 including Slice UP NF_1, . . . , Slice UP NF_n which are user plane network functions defined to be used only within a network slice.

The home PLMN includes a subscriber repository 103 that stores subscription information of a terminal, a home policy control function 102 that controls applying a policy in the home PLMN, an application function (AF) 104 that provides information about the policy to the home policy control function 102, and a slice specific core network function 106 that collects network functions related to a network slice. The slice specific core network function 106 includes SSCNF 109 including Slice CP NF_1, . . . , Slice CP NF_n which are control plane network functions defined to be used only within a network slice, and SSUNF 110 including Slice UP NF_1, . . . , Slice UP NF_n which are user plane network functions defined to be used only within a network slice.

In addition, the core network may include a visited NF repository function 112 and a home NF repository function 113, which find appropriate network functions from network functions of the visited PLMN and the home PLMN by request. The visited NF repository function 112 may be located within the CCNF 101. Also, the home NF repository function 113 may operate as a network function instance (NFI) selector located within the CCNF 101 and performing a function of selecting an appropriate NF from a network slice instance. Although this disclosure uses the term "NF repository function" for convenience of description, this may refer to an NFI selector when a network slice is used. Also, the NF repository function may be referred to as "NF discovery device" or "NF storage device".

The CCNF 101 is connected to a terminal attaching to the visited PLMN and a base station accessed by the terminal, processes control messages for managing the terminal, and manages the mobility of the terminal. In addition, the CCNF 101 is connected to the subscriber repository 103 located in the home PLMN, receives subscriber related information from the subscriber repository 103, and performs authentication of the terminal. Also, the CCNF 101 selects a network slice instance to be provided to the terminal by using information of the accessing terminal, and selects an appropriate slice CP NF (control plane network function) from the SSCNF 107 belonging to the corresponding network slice instance. The CCNF 101 may use the visited NF repository function 112 to select the appropriate slice CP NF. The slice CP NF selects an appropriate slice UP NF (user plane network function) from the SSUNF 108 belonging to the network slice instance. The slice CP NF may use the visited NF repository function 112 to select the appropriate slice UP NF.

Alternatively, the CCNF 101 may select a network slice instance to be provided to the corresponding terminal by using information of the terminal, select a slice CP NF from the SSCNF 107 belonging to the corresponding network slice instance, and select a slice UP NF from the SSUNF 108 belonging to the corresponding network slice instance. That is, the CCNF 101 may select both the slice CP NF and the slice UP NF. Also, the CCNF 101 may use the visited NF repository function 110 to select appropriate slice CP NF and slice UP NF.

The slice CP NF and the slice UP NF selected in the visited PLMN support a data service in a terminal-belonging network slice through connection with a slice CP NF and a slice UP NF selected from the SSCNF 109 and the SSUNF 110 belonging to the home PLMN.

The slice CP NF manages a packet data unit (PDU) session so that the terminal can receive a service through a data network (NW). The slice CP NF may include a session management function for managing transmission of service data for the terminal by communicating with the selected slice UP NFs.

The slice UP NF may perform a user plane function of a packet data unit gateway (P-GW) in the Long Term Evolution (LTE) system, such as processing packets for user service data through connection with a terminal and a base station.

The above-mentioned functions, for example, the subscriber authentication function of the CCNF 101, the terminal mobility management function, the network slice selection function, the function of selecting the SSCNFs 107 and 109 and the SSUNFs 108 and 110, and the function of processing control message through connection with a terminal and a base station, may be defined as individual network functions or as a partly combined network function.

Figure 2:
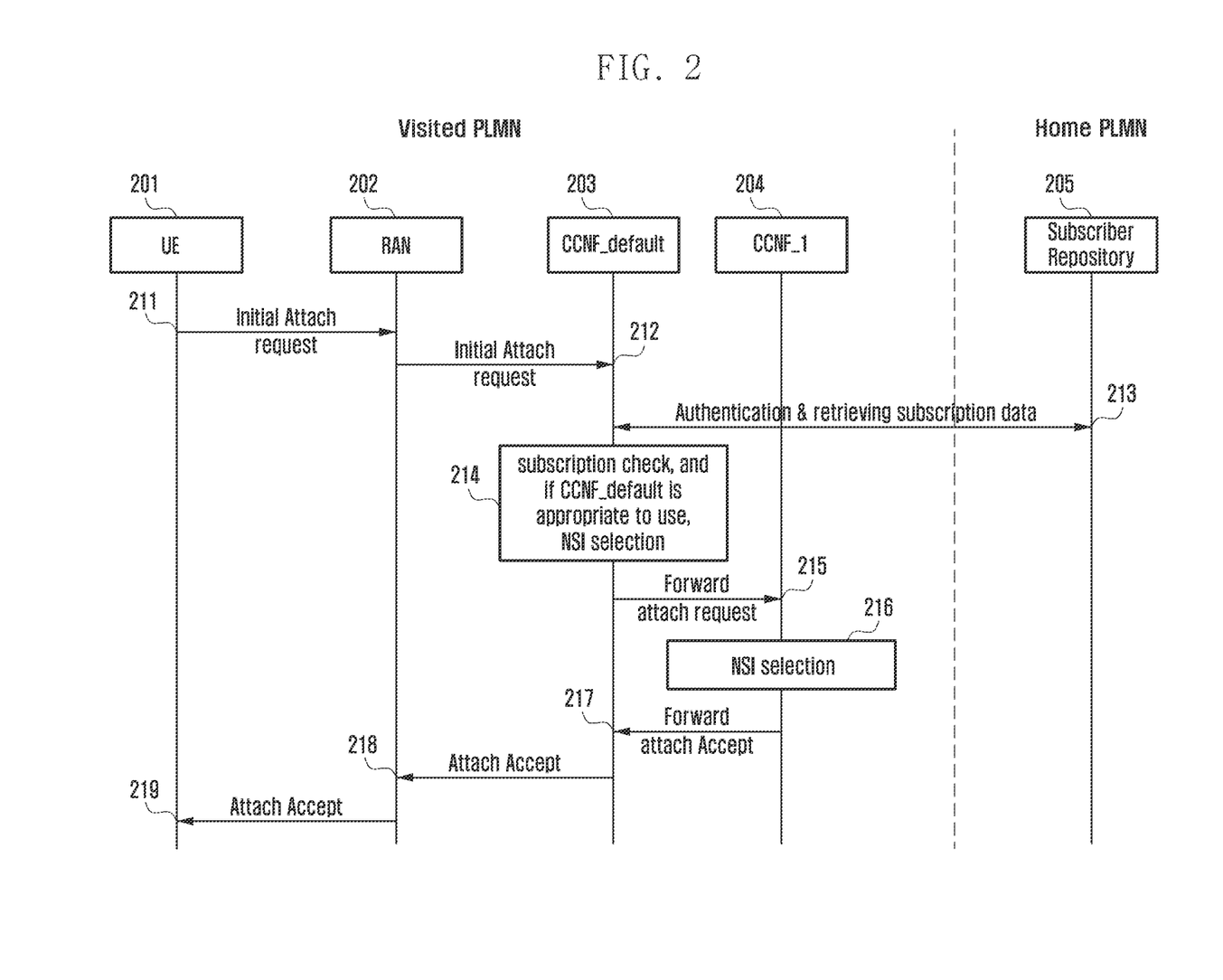
FIG. 2 illustrates a network initial attach and registration procedure of a terminal in a roaming environment to which a network slice is applied, according to an embodiment of the disclosure.

FIG. 2 illustrates a network initial attach and registration procedure of a terminal in a roaming environment to which a network slice is applied, according to an embodiment of the disclosure.

User equipment (UE) 201, that is, a terminal, transmits at step 211, to a radio access network (RAN) 202, that is, a base station, an initial attach request for requesting registration to attach to a visited PLMN according to roaming. The initial attach request may contain UE identification information, e.g., an international mobile subscriber identity (IMSI), an international mobile equipment identity code (IMEI), or a temporary ID such as a globally unique temporary identifier (GUTI). In addition, the initial attach request may contain slice selection assistance information including information about a service registered in a home PLMN operator by the UE, a service type supporting the service, a network slice type, or an identifier (ID) indicating a network slice.

When the initial attach request is received from the UE 201, the RAN 202 selects a default CCNF 203 to process the initial attach request, and transmits the received initial attach request at step 212. Based on at least a part of the slice selection assistance information or preset information in the visited PLMN, the RAN 202 may select the default CCNF 203 to support a network slice or service subscribed by the UE.

When the initial attach request is received from the RAN 202, the default CCNF 203 connects with a subscriber repository 205 existing in the home PLMN to which the UE 201 belongs, performs an authentication procedure for determining whether the UE 201 is true UE, and retrieves subscription information (i.e., subscription data) of the UE 201 at step 213.

The subscription information of the UE 201 may include information of a network slice to which the UE 201 subscribes. Also, at the authentication and subscription data retrieval step 213, the default CCNF 203 may receive, from the subscriber repository 205, information of default data network name (DNN) and information of a DNN list allowed according to a service level agreement (SLA) between the visited PLMN and the home PLMN.

Based on the slice selection assistance information received from the RAN 202 at the initial attach request reception step 212 and the subscription information of the UE 201 received from the subscriber repository 205 at the authentication and subscription data retrieval step 213, the default CCNF 203 selects at step 214 a network slice instance that can be provided in the visited PLMN.

However, if the default CCNF 103 has difficulty in finding an appropriate network slice instance or if there is a more appropriate CCNF, the default CCNF 103 may forward an attach message to the more appropriate CCNF so that the more appropriate CCNF will be used as a serving CCNF 103. That is, if the default CCNF is suitable for use, it may select a network slice instance at step 214. However, if not suitable or if there is a more appropriate CCNF, the attach message is forwarded to the CCNF at step 215, and the CCNF selects a network slice instance at step 216. Hereinafter, the more appropriate CCNF will be defined and described as CCNF_1 204.

When the default CCNF 203 forwards the attach request message to the CCNF_1 204 at step 215, the serving CCNF is changed. The forwarded attach request message may contain information included in the initial attach request 212, e.g., the UE identification information and the slice selection assistance information. In addition, the forwarded attach request message may contain information acquired at the authentication and subscription data retrieval step 213, e.g., a subscribed mobility management (MM) context and a subscribed service management (SM) context. The subscribed SM context may include information about a default DNN and information about an allowed DNN list.

Alternatively, the CCNF_1 204 may acquire information such as the subscribed MM context and the subscribed SM context by retrieving subscription information via connection with the subscriber repository 205. The subscribed SM context may include information about a default DNN and information about an allowed DNN list.

Meanwhile, at the network slice instance selection step 216, the CCNF_1 204 may select a network slice that can be provided by the visited PLMN, based on the slice selection assistance information or the like delivered through the attach request step 215. The CCNF_1 204 allocates a temporary ID of the UE, inserts information about a service agreed in the network, e.g., agreed slice selection assistance information, in an attach accept message, and forwards it to the default CCNF 203 at step 217. The default CCNF 203 transmits the attach accept message to the RAN 202 at step 218, and the RAN 202 transmits the attach accept message to the UE 201 at step 219.

The above-described attach procedure may be applied even to a non-roaming situation. If information of a default DNN or allowed DNN list is a DNN value used in the home PLMN when the default CCNF 203 or the CCNF_1 204 selects a network slice instance in a roaming situation, a home-routed traffic dedicated network slice instance may be selected.

Figure 3:
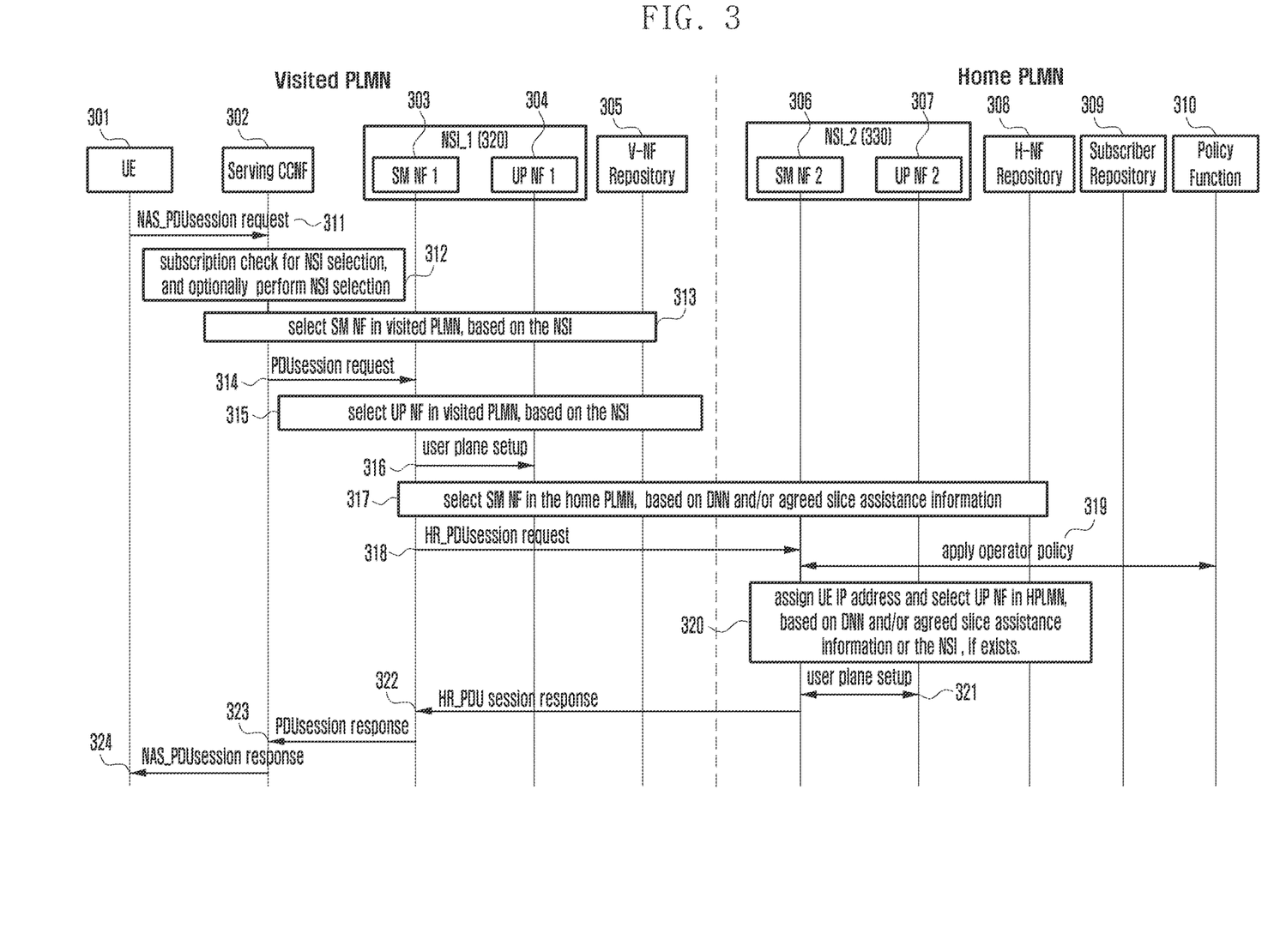
FIG. 3 illustrates a process in which a terminal generates a PDU session for home-routed traffic in a roaming environment to which a network slice is applied, according to another embodiment of the disclosure.

FIG. 3 illustrates a process in which a terminal generates a PDU session for home-routed traffic in a roaming environment to which a network slice is applied, according to another embodiment of the disclosure.

In order to generate the PDU session in a visited PLMN which is in roaming, the terminal (i.e., UE) 301 transmits a NAS_PDU session request message for access to a serving CCNF 302 at step 311. The NAS_PDU session request message includes at least one of a temporary ID which is an identifier of the UE, requested slice assistance information indicating a characteristic of the PDU session to be generated by the UE or a characteristic of a service to be used by the UE, or all or some parameters of a DNN. Like an access point name (APN) in the LTE network, the DNN indicates information of a network from which the UE will receive an Internet protocol (IP) address to be used. When the DNN is not contained in the NAS_PDU session request message, a default DNN acquired from subscription information may be used as the DNN.

When the NAS_PDU session request message is received at step 311, the serving CCNF 302 may check subscription information at step 312 in order to determine whether a service is available for the slice assistance information and DNN requested by the UE. For this, the serving CCNF may request and retrieve the subscription information from a subscriber repository 309 in a home PLMN. In addition, when a network slice instance that allows a service for the requested slice assistance information and DNN is not determined, the serving CCNF 302 may select an appropriate network slice instance by using a network slice instance (NSI) selector.

The serving CCNF 302 may select at step 313 an SM NF1 303 which is an NF for session management, based on information about the network slice instance selected at the subscription information check step 312. Specifically, the serving CCNF 302 may select the SM NF1 303, based on a network function of the serving CCNF 302 and information about a network slice. Alternatively, the serving CCNF 302 may select the SM NF1 303 by requesting an entity, such as an NF repository function 305 capable of finding an appropriate network function, to find an appropriate SM NF on the basis of the selected network slice instance information. A method for the serving CCNF 302 to find the SM NF by using the NF repository function 305 will be described later with reference to FIG. 4.

When the SM NF1 303 is selected at the SM NF selection step 313, the serving CCNF 302 may transmit a PDU session request message to the SM NF1 303 at step 314 in order to set up a PDU session. The PDU session request message may contain at least one of a UE identifier such as an IMSI or a temporary ID, agreed slice assistance information, a DNN, a session ID, NSI_1 which is information about the selected network slice instance, or the NAS_PDU session request message.

The SM NF1 303 may select at step 315 a UP NF1 304 which is an NF for a user plane function, based on the NSI_1 received in the PDU session request message 314. The SM NF1 303 may select the UP NF1 304, based on its own network function and information about a network slice. Alternatively, the SM NF1 303 may select the UP NF1 304 by requesting an entity, such as the NF repository function 305 capable of finding an appropriate network function, to find an appropriate UP NF on the basis of the selected network slice instance information, i.e., the NSI_1. A method for the SM NF 303 to find the UP NF by using the NF repository function 305 will be described later with reference to FIG. 5.

The SM NF1 303 sets up a user plane for the selected UP NF1 304 at step 316.

When the SM NF1 303 recognizes from the DNN that the PDU session request of the UE is for home-routed traffic, the SM NF1 303 selects an appropriate SM NF in the home PLMN at step 317 in order to transmit the PDU session request message. The SM NF1 303 of the visited PLMN may select the SM NF of the home PLMN by requesting an entity, such as the NF repository function 305 of the visited PLMN capable of finding an appropriate network function, to find an appropriate SM NF on the basis of at least a part of the DNN or agreed slice assistance information. Also, when the home PLMN supports a network slice, the SM NF1 304 may acquire together information about a network slice instance to which the selected SM NF of the home PLMN belongs. The NF repository function 305 of the visited PLMN may find an appropriate SM NF and a network slice instance of the home PLMN to which the SM NF belongs, in the home PLMN through an NF repository function 308 of the home PLMN. This method will be described later with reference to FIG. 6. Meanwhile, the SM NF selection step 317 of the home PLMN may be performed by the SM NF1 303 of the visited PLMN as described above, or may be performed by the serving CCNF 302. Hereinafter, the SM NF selected in the home PLMN will be defined and described as an SM NF2 306.

The SM NF1 303 transmits at step 318 an HR_PDU session request message to the SM NF2 306 selected in the home PLMN in order to set up a PDU session. The HR_PDU session request message may contain at least one of a UE identifier such as an IMSI, agreed slice assistance information, a session ID, an address of the UP NF1 304 of the visited PLMN, or information of network slice instance including the SM NF2 306 of the home PLMN acquired at the SM NF selection step 317 of the home PLMN.

When the HR_PDU session request message is received at step 318, the SM NF2 performs authorization based on an operator's policy through a policy function 310 at step 319.

After the authorization, the SM NF2 306 assigns an IP address of the UE 301 and selects an appropriate UP NF for setting up a user plane in the home PLMN at step 320. The SM NF2 306 may send a request to an entity such as the NF repository function 308 of the home PLMN capable of finding an appropriate network function and retrieve the appropriate UP NF in the home PLMN, based on at least a part of the DNN or agreed slice assistance information. Alternatively, when there is information of a network slice instance to which the SM NF2 306 belongs, the SM NF2 306 may send a request to an entity such as the NF repository function 308 of the home PLMN capable of finding an appropriate network function and retrieve the appropriate UP NF in the home PLMN, based on the network slice instance information. A method for the SM NF2 306 to retrieve the UP NF in the home PLMN by using the NF repository function 308 of the home PLMN will be described later with reference to FIG. 7. Hereinafter, the UP NF selected in the home PLMN will be defined and described as a UP NF2 307.

After assigning the UE IP address and selecting the UP NF in the home PLMN at step 320, the SM NF2 306 sets up a user plane for the selected UP NF2 307 at step 321. In addition, the SM NF2 306 transmits an HR_PDU session response message containing a setup result of a PDU session to the SM NF1 303 of the visited PLMN at step 322. The HR_PDU session response message may contain at least one of the UE IP address acquired at the step 320, a session ID, or address information of the selected UP NF2 307.

The SM NF1 303 forwards the PDU session setup result to the UE 301 via the serving CCNF 302. Specifically, at step 323, the SM NF1 303 generates a NAS_PDU session response message and transmits, to the serving CCNF 302, a PDU session response containing the NAS_PDU session response message together with a UE temporary ID and the session ID. The NAS_PDU session response message may contain at least one of the agreed slice assistance information, the DNN, the UE IP address, or the session ID. At step 324, the serving CCNF 302 forwards the NAS_PDU session response message to the UE to inform that the PDU session is generated.

Figure 4:
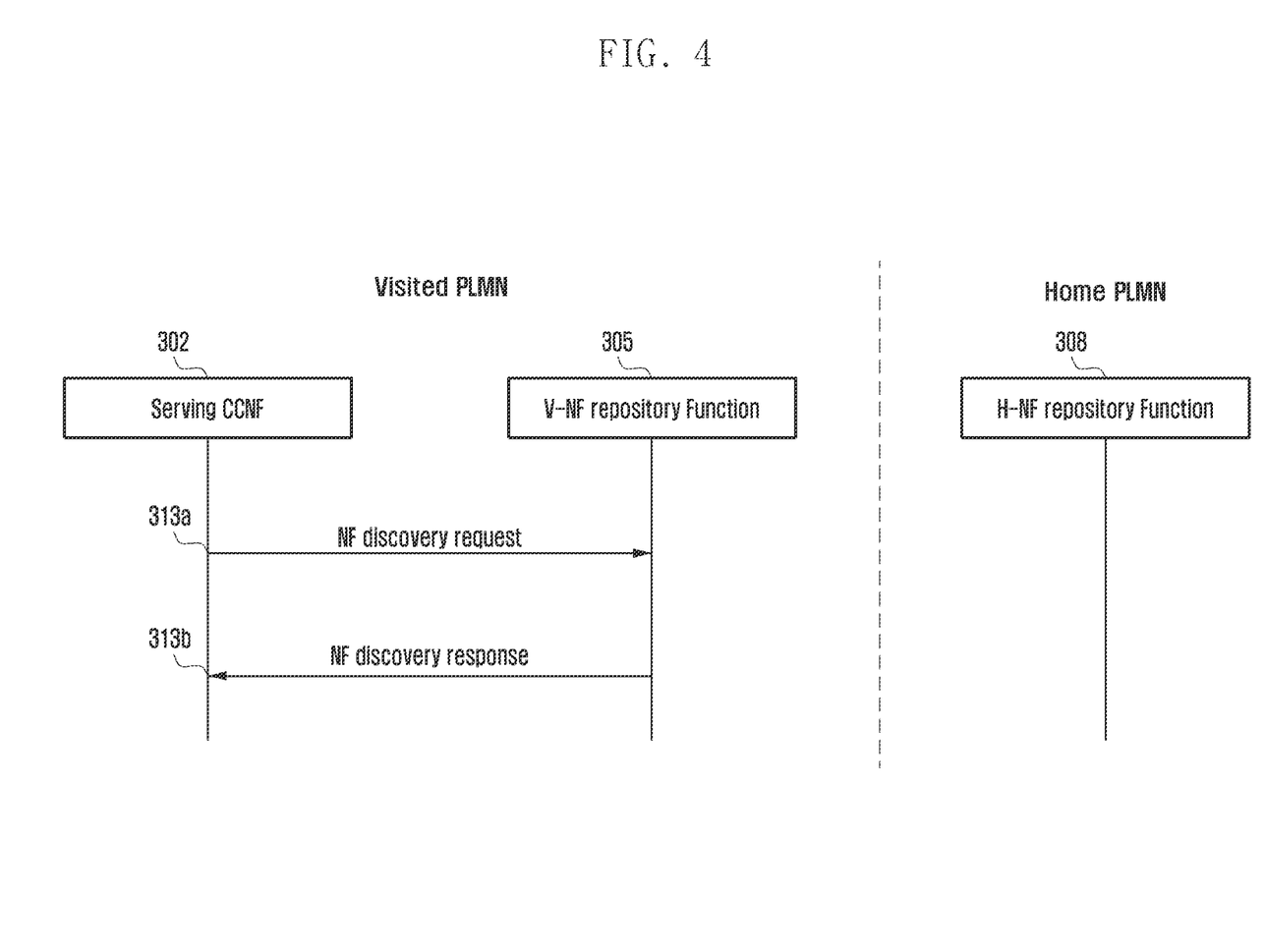
FIG. 4 illustrates a process in which a serving CCNF finds an appropriate SM NF through an NF repository function at the SM NF selection step 313 of FIG. 3.

FIG. 4 illustrates a process in which a serving CCNF finds an appropriate SM NF through an NF repository function at the SM NF selection step 313 of FIG. 3.

The serving CCNF 302 sends at step 313a an NF discovery request message to the NF repository function 305 of the visited PLMN to request finding an appropriate SM NF. The NF discovery request message may contain at least one of SM NF information which is information about a type of NF to be found, serving CCFN information which is information about a requesting NF, a visited PLMN ID which is information about a PLMN from which a requested NF will be found, or previously allocated network slice instance information. In addition, the NF discovery request message may further contain at least one of an IMSI or a temporary ID as identification information of the UE.

In response to the request of the step 313a, the NF repository function 305 finds an appropriate SM NF by searching its database or other database and then forwards address information of the SM NF to the serving CCNF 302 at step 313b.

Figure 5:
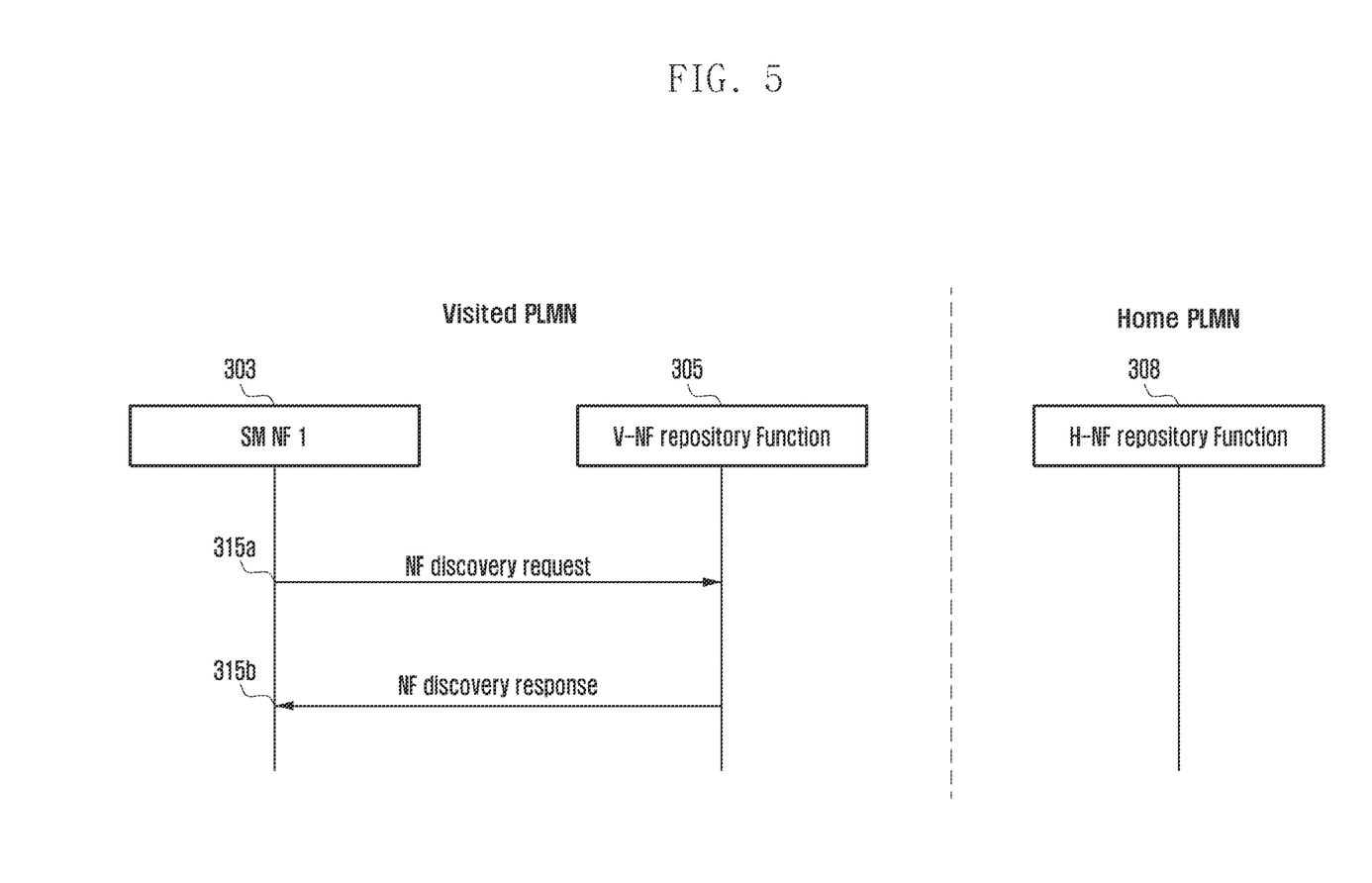
FIG. 5 illustrates a process in which an SM NF1 finds an appropriate UP NF through an NF repository function at the UP NF selection step 315 of FIG. 3.

FIG. 5 illustrates a process in which an SM NF1 finds an appropriate UP NF through an NF repository function at the UP NF selection step 315 of FIG. 3.

The SM NF1 303 sends at step 315a an NF discovery request message to the NF repository function 305 of the visited PLMN to request finding an appropriate UP NF. The NF discovery request message may contain at least one of UP NF information which is information about a type of NF to be found, SM NF1 information which is information about a requesting NF, a visited PLMN ID which is information about a PLMN from which a requested NF will be found, or previously allocated network slice instance information. In addition, the NF discovery request message may further contain at least one of an IMSI or a temporary ID as identification information of the UE.

In response to the request of the step 315a, the NF repository function 305 finds an appropriate UP NF by searching its database or other database and then forwards address information of the UP NF to the SM NF1 303 at step 315b.

Figure 6:
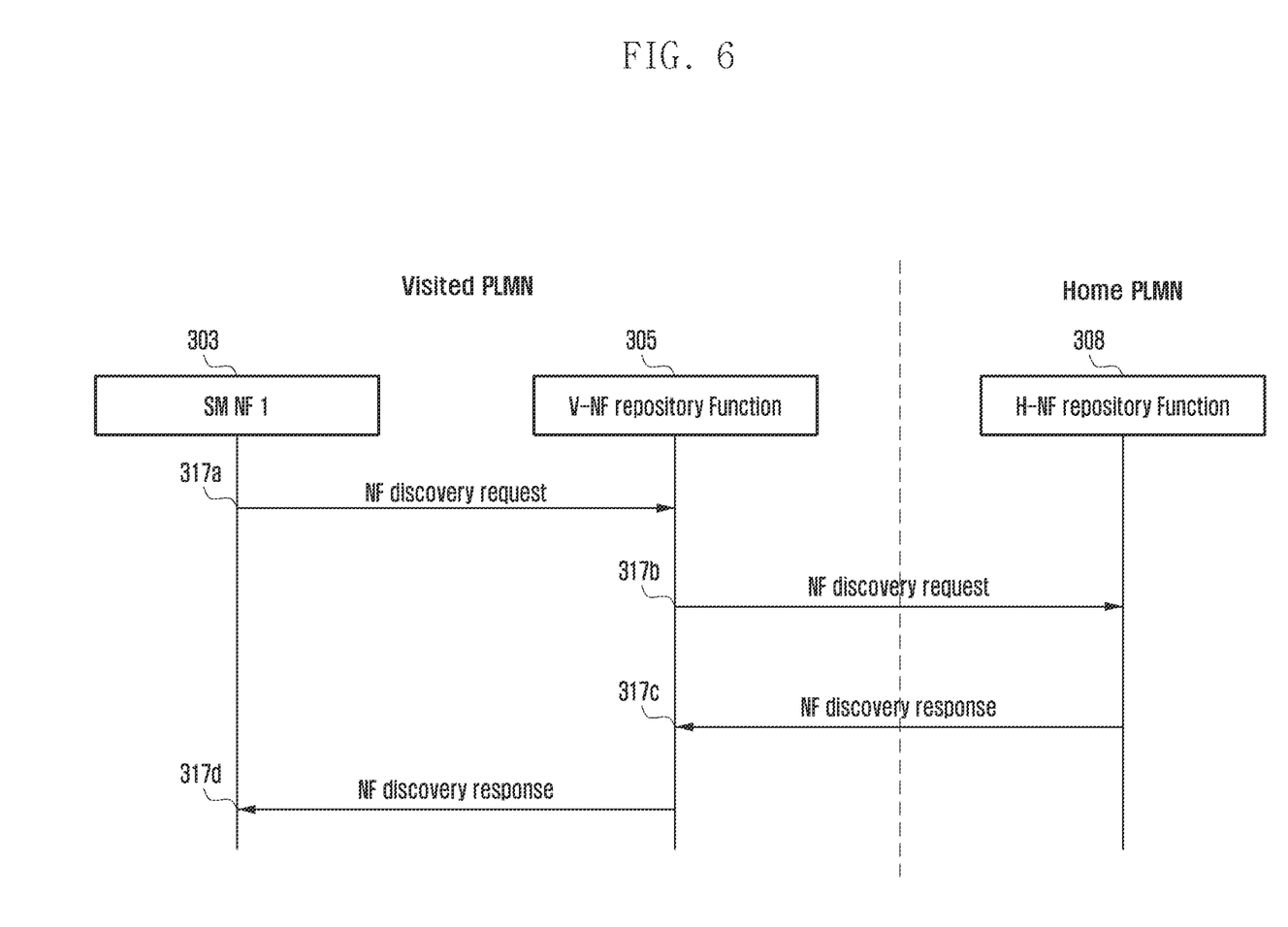
FIG. 6 illustrates a process in which an SM NF1 of a visited PLMN finds an appropriate SM NF in a home PLMN through an NF repository function at the SM NF selection step 317 of the home PLMN of FIG. 3.

FIG. 6 illustrates a process in which an SM NF1 of a visited PLMN finds an appropriate SM NF in a home PLMN through an NF repository function at the SM NF selection step 317 of the home PLMN of FIG. 3.

The SM NF1 303 sends at step 317a an NF discovery request message to the NF repository function 305 of the visited PLMN to request finding an appropriate SM NF in the home PLMN. The NF discovery request message may contain at least one of SM NF information which is information about a type of NF to be found, SM NF1 information which is information about a requesting NF, a home PLMN ID which is information about a PLMN from which a requested NF will be found, previously allocated network slice instance information if it exists, a DNN, or agreed slice assistance information. In addition, the NF discovery request message may further contain at least one of an IMSI or a temporary ID as identification information of the UE.

In response to the request of the step 317a, the NF repository function 305 of the visited PLMN sends the NF discovery request message to the NF repository function 308 of the home PLMN at step 317b. Then, the NF repository function 308 of the home PLMN finds an appropriate SM NF by searching its database or other database and forwards address information of the SM NF to the NF repository function 305 of the visited PLMN at step 317c. In case where the home PLMN supports a network slice, information about a network slice instance to which the found SM NF belongs may be forwarded together to the NF repository function 305 of the visited PLMN. Then, the NF repository function 305 of the visited PLMN forwards the received information to the SM NF1 303 as response at step 317d.

Figure 7:
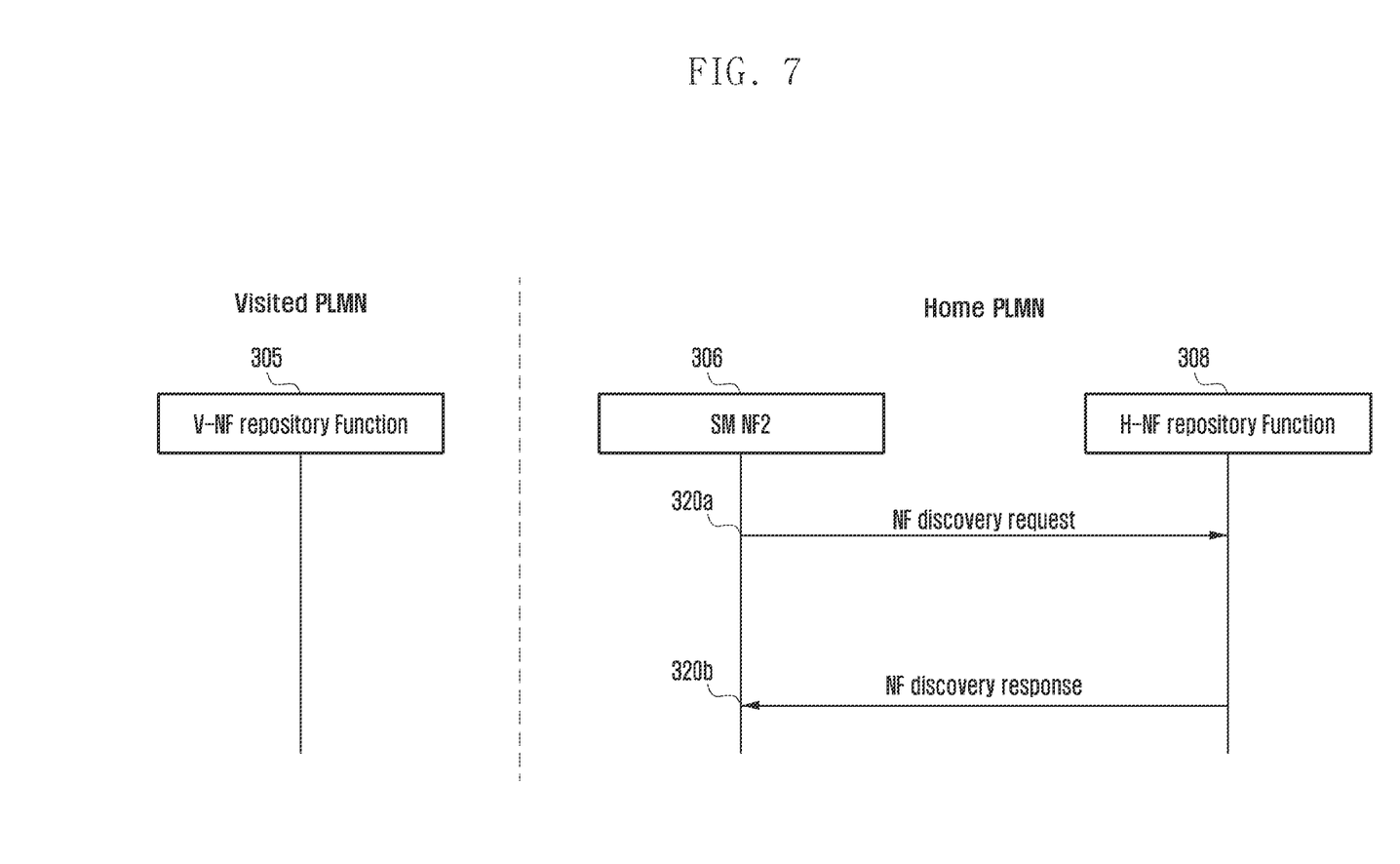
FIG. 7 illustrates a process in which an SM NF2 finds an appropriate UP NF through an NF repository function at the UP NF selection step 320 of FIG. 3.

FIG. 7 illustrates a process in which an SM NF2 finds an appropriate UP NF through an NF repository function at the UP NF selection step 320 of FIG. 3.

The SM NF2 306 sends at step 320a an NF discovery request message to the NF repository function 308 of the home PLMN to request finding an appropriate UP NF. The NF discovery request message may contain at least one of UP NF information which is information about a type of NF to be found, SM NF2 information which is information about a requesting NF, a home PLMN ID which is information about a PLMN from which a requested NF will be found, previously allocated network slice instance information if it exists, a DNN, or agreed slice assistance information. In addition, the NF discovery request message may further contain at least one of an IMSI or a temporary ID as identification information of the UE.

In response to the request of the step 320a, the NF repository function 308 finds an appropriate UP NF by searching its database or other database and then forwards address information of the UP NF to the SM NF2 306 at step 320b.

Figure 8:
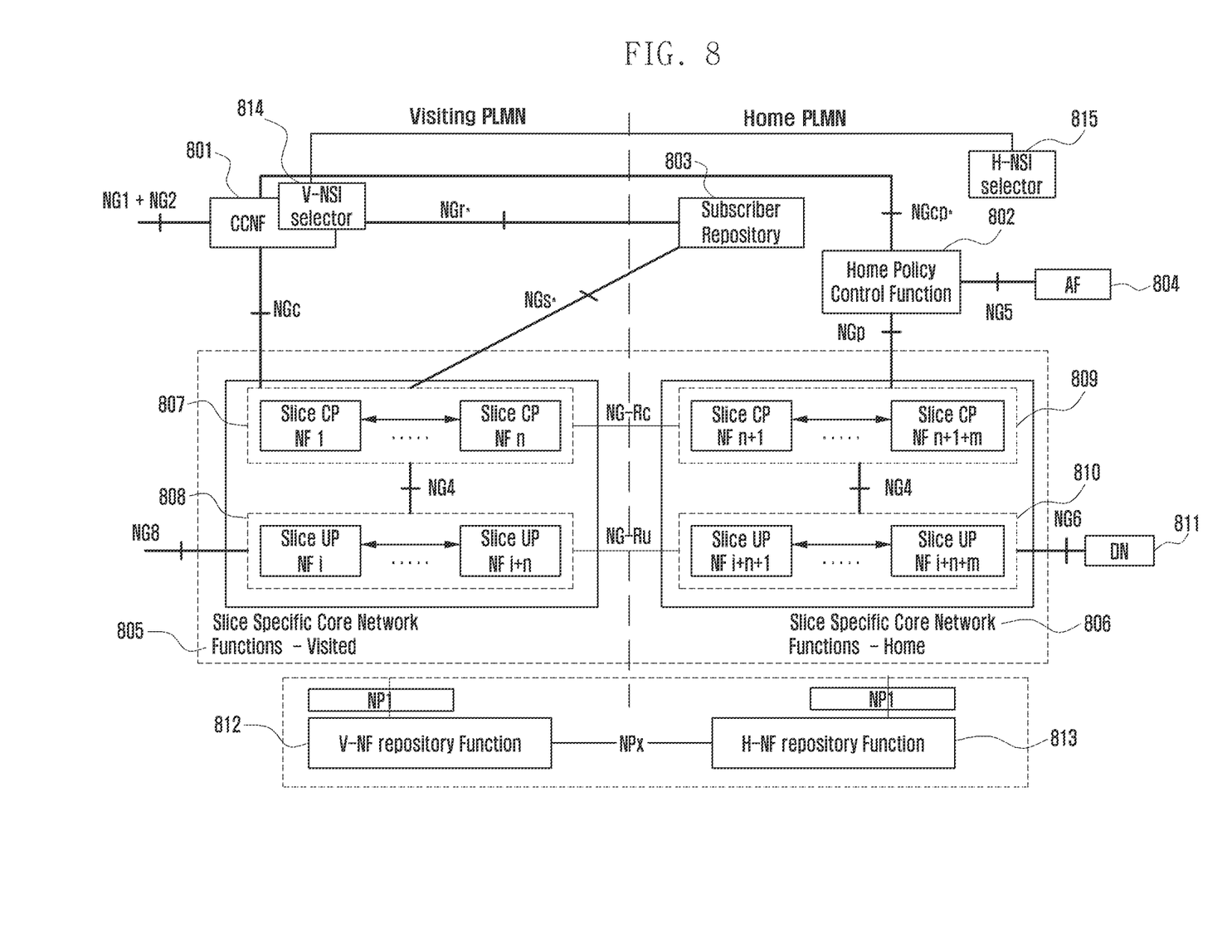
FIG. 8 illustrates another example of a core network architecture excluding a terminal and a base station in a network that supports roaming between wireless communication systems applying a network slice and also serves home-routed traffic.

FIG. 8 illustrates another example of a core network architecture excluding a terminal and a base station in a network that supports roaming between wireless communication systems applying a network slice and also serves home-routed traffic. According to the network architecture of FIG. 8, contrary to the network architecture of FIG. 1, a network slice instance for serving home-routed traffic is used through an NSI selector in a home PLMN.

Referring to FIG. 8, a visited PLMN to which a roaming terminal will attach includes a CCNF 801 and a slice specific core network function 805 that collects network functions related to a network slice. The slice specific core network function 805 includes SSCNF 807 including Slice CP NF_1, . . . , Slice CP NF_n which are control plane network functions defined to be used only within a network slice, and SSUNF 808 including Slice UP NF_1, . . . , Slice UP NF_n which are user plane network functions defined to be used only within a network slice. The CCNF 801 may include a network slice instance (NSI) selector 814 in the visited PLMN.

The home PLMN includes a subscriber repository 803 that stores subscription information of a terminal, a home policy control function 802 that controls applying a policy in the home PLMN, an AF 804 that provides information about the policy to the home policy control function 802, and a slice specific core network function 806 that collects network functions related to a network slice. The slice specific core network function 806 includes SSCNF 809 including Slice CP NF_1, . . . , Slice CP NF_n which are control plane network functions defined to be used only within a network slice, and SSUNF 810 including Slice UP NF_1, . . . , Slice UP NF_n which are user plane network functions defined to be used only within a network slice. The home PLMN may include a network slice instance (NSI) selector 815 that selects a network slice in the home PLMN.

In addition, the core network may include a visited NF repository function 812 and a home NF repository function 813, which find appropriate network functions from network functions of the visited PLMN and the home PLMN by request. The visited NF repository function 812 may be located within the CCNF 801. Also, the home NF repository function 813 may operate as an NFI selector located within the CCNF 801 and performing a function of selecting an appropriate NF from a network slice instance. Although this disclosure uses the term "NF repository function" for convenience of description, this may refer to an NFI selector when a network slice is used.

The CCNF 801 is connected to a terminal attaching to the visited PLMN and a base station accessed by the terminal, processes control messages for managing the terminal, and manages the mobility of the terminal. In addition, the CCNF 801 is connected to the subscriber repository 803 located in the home PLMN, receives subscriber related information from the subscriber repository 803, and performs authentication of the terminal. Also, the CCNF 801 selects a network slice instance to be provided to the terminal by using information of the accessing terminal, and selects an appropriate slice CP NF from the SSCNF 807 belonging to the corresponding network slice instance. The CCNF 801 may use the visited NF repository function 812 to select the appropriate slice CP NF. The slice CP NF selects an appropriate slice UP NF from the SSUNF 808 belonging to the network slice instance. The slice CP NF may use the visited NF repository function 812 to select the appropriate slice UP NF.

Alternatively, the CCNF 801 may select, through the NSI selector 814, a network slice instance to be provided to the corresponding terminal by using information of the terminal, select a slice CP NF from the SSCNF 807 belonging to the corresponding network slice instance, and select a slice UP NF from the SSUNF 808 belonging to the corresponding network slice instance. That is, the CCNF 801 may select both the slice CP NF and the slice UP NF. Also, the CCNF 801 may use the visited NF repository function 810 to select appropriate slice CP NF and slice UP NF.

The slice CP NF and the slice UP NF selected in the visited PLMN through the NSI selector 814 support a data service in a terminal-belonging network slice through connection with a slice CP NF and a slice UP NF selected from the SSCNF 809 and the SSUNF 810 selected through the NSI selector 815 belonging to the home PLMN.

In case of generating a PDU session for home-routed traffic in the network architecture of FIG. 8, procedures similar to those of FIG. 3 are performed. However, at the subscription data check step 312, the serving CCNF 302 transmits at least one of a home PLMN ID, DNN information, or agreed slice assistance information to the NSI selector of the visited PLMN in order to request an appropriate network slice instance value of the home PLMN. The NSI selector of the visited PLMN forwards information received from the serving CCNF 302 to the NSI selector of the home PLMN. The NSI selector of the home PLMN selects an appropriate network slice instance, based on the above information, and forwards the selected network slice instance to the serving CCNF 302. In addition, the network slice instance information NSI_2 of the selected home PLMN is forwarded to the SM NF1 via the PDI session request 314 and may be used at step 317 of selecting the SM NF of the home PLMN.

Figure 9:
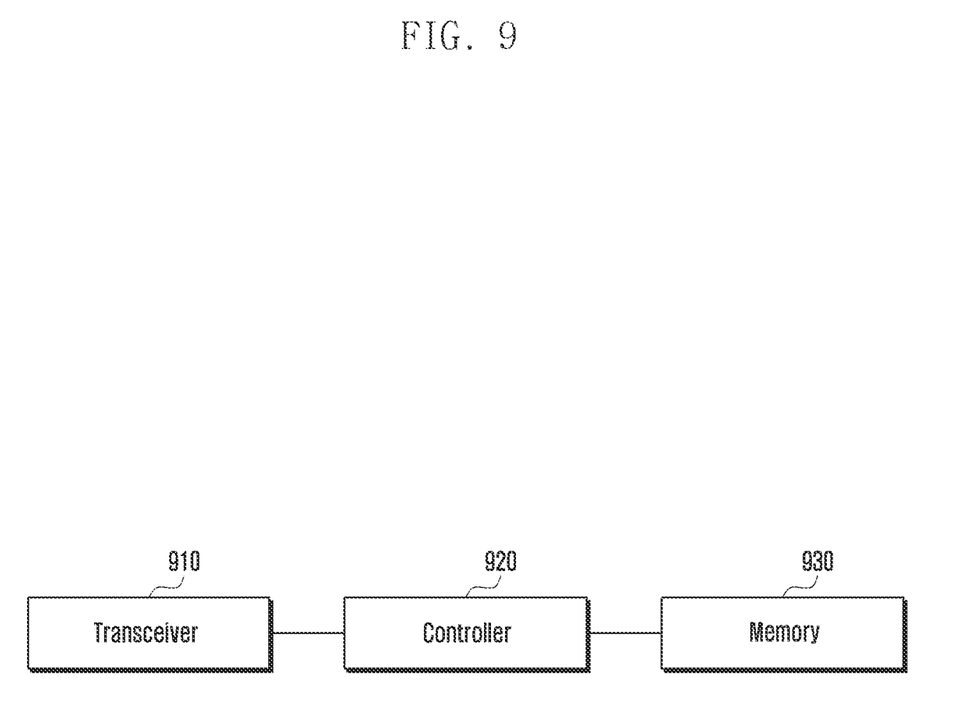
FIG. 9 is a diagram illustrating a structure of a terminal according to an embodiment of the disclosure.

FIG. 9 is a diagram illustrating a structure of a terminal according to an embodiment of the disclosure.

Referring to FIG. 9, the terminal may include a transceiver 910, a controller 920, and a storage 930. In the disclosure, the controller 920 may be defined as a circuit, an application specific integrated circuit, or at least one processor.

The transceiver 910 may transmit and receive signals to and from other network entities. For example, in a network initial connection and registration procedure of the terminal in a roaming environment to which a network slice is applied as shown in FIG. 2, the transceiver 910 may transmit an initial attach request message to a base station (step 211) or receive an initial attach accept message from the base station (step 219). Also, in a process in which the terminal generates a PDU session for home-routed traffic in a roaming environment to which a network slice is applied as shown in FIG. 3, the transceiver 910 may transmit a PDU session request message to a serving CCNF (step 311) or receive a PDU session response message from the serving CCNF (step 324).

The controller 920 may control the overall operation of the terminal according to embodiments of the disclosure. For example, the controller 920 may control signal flows between respective blocks to perform operations according to flowcharts described above. In particular, the controller 920 may control operations disclosed herein for attachment and home-routed PDU session generation of the terminal according to embodiments of the disclosure. In an embodiment, the controller 920 may be configured to control the transceiver 910 to transmit a PDU session request message, which contains slice assistance information indicating the characteristics of a service that the terminal desires to use, to a CCNF of a visited PLMN, and also control the transceiver 910 to receive a PDU session response message containing an IP address of the terminal from the CCNF of the visited PLMN.

The storage 930 may store at least one of information transmitted/received through the transceiver 910 and information generated through the controller 920. For example, the storage 930 may store information for identifying the terminal, slice selection assistance information, and the like.

Figure 10:
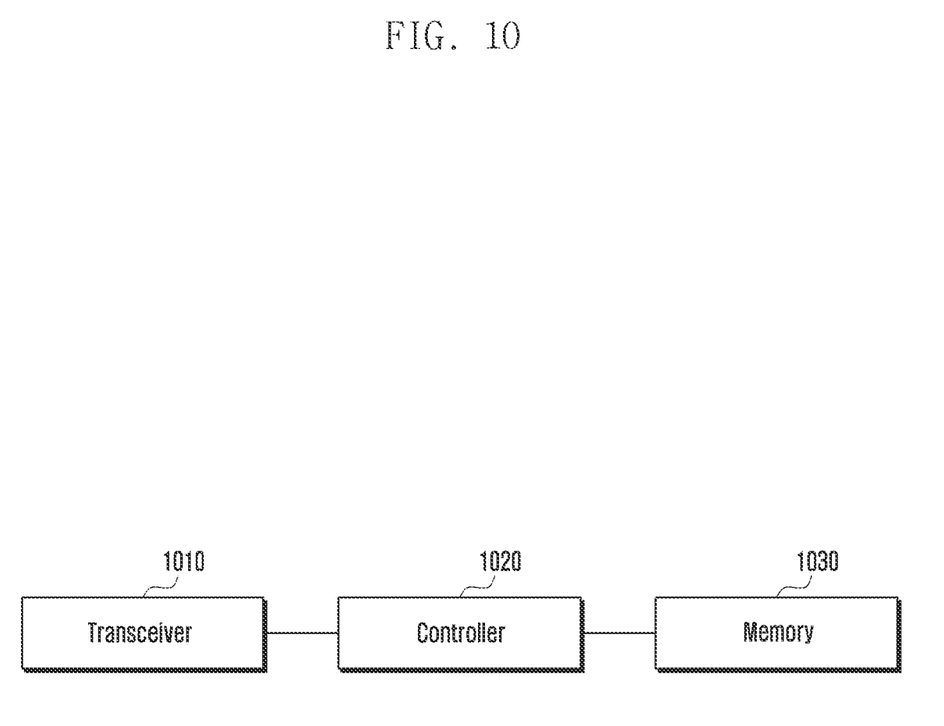
FIG. 10 is a diagram illustrating a structure of a CCNF according to an embodiment of the disclosure.

FIG. 10 is a diagram illustrating a structure of a CCNF according to an embodiment of the disclosure.

Referring to FIG. 10, the CCNF may include a transceiver 1010, a controller 1020, and a storage 1030. In the disclosure, the controller 1020 may be defined as a circuit, an application specific integrated circuit, or at least one processor.

The transceiver 1010 may transmit and receive signals to and from other network entities. For example, in a network initial connection and registration procedure of a terminal in a roaming environment to which a network slice is applied as shown in FIG. 2, the transceiver 1010 may receive an initial attach request message from a base station (step 212) or transmit an initial attach accept message to the base station (step 218). Also, in a process in which the terminal generates a PDU session for home-routed traffic in a roaming environment to which a network slice is applied as shown in FIGS. 3 and 4, the transceiver 1010 may receive a PDU session request message from the terminal (step 311), transmit the PDU session request message to an SM NF1 (step 314), receive a PDU session response message from the SM NF1 (step 323), transmit the PDU session response message to the terminal (step 324), transmit an NF discovery request message to an NF repository function (step 313a), or receive an NF discovery response message from the NF repository function (step 313b).

The controller 1020 may control the overall operation of the CCNF according to embodiments of the disclosure. For example, the controller 1020 may control signal flows between respective blocks to perform operations according to flowcharts described above. In particular, the controller 1020 may control operations disclosed herein for attachment and home-routed PDU session generation of the terminal according to embodiments of the disclosure. In an embodiment, the controller 1020 may be configured to control the transceiver 1010 to receive a PDU session request message, which contains slice assistance information indicating the characteristic of a service that the terminal desires to use, from the terminal, to transmit a first discovery request message containing a home PLMN ID of the terminal and the slice assistance information to an NF repository function, and to receive a first discovery response message containing an address of an SF NF of the home PLMN from the NF repository function.

The storage 1030 may store at least one of information transmitted/received through the transceiver 1010 and information generated through the controller 1020. For example, the storage 1030 may store an ID of a terminal, a home PLMN ID of the terminal, slice selection assistance information, an IP address of the terminal, and the like.

In the above-described embodiments of the disclosure, various elements are expressed in singular or plural forms. However, such singular or plural forms are merely selected for the sake of convenience of description and not intended to limit the disclosure. Any element expressed in a plural form may refer to a singular element, and vice versa.

While the disclosure has been described in detail with reference to specific embodiments thereof, various changes and modifications may be made without departing from the scope of the disclosure. Therefore, the scope of the disclosure should not be limited to the described embodiments, but should be determined by the scope of the appended claims and equivalents.

The invention claimed is:

1. A method performed by a first network repository function (NRF) entity in a serving public land mobile network (PLMN), the method comprising:
 receiving, from a requesting network function (NF) entity in the serving PLMN, a first NF discovery request message comprising an identifier of a home PLMN, network slice assistance information, and a data network name;
 transmitting, to a second NRF entity in the home PLMN, a second NF discovery request message comprising the network slice assistance information and the data network name, based on the identifier of the home PLMN;
 as a response to the second NF discovery request message, receiving, from the second NRF entity, a first NF discovery response message comprising an address of a target NF in the home PLMN; and
 transmitting, to the requesting NF entity, a second NF discovery response message comprising the address of the target NF.

2. The method of claim 1, wherein the first NF discovery request message further comprises at least one of network slice instance information or a type of the target NF.

3. The method of claim 1, wherein the second NF discovery response message further comprises network slice instance information associated with the target NF.

4. A first network repository function (NRF) entity in a serving public land mobile network (PLMN), the first NRF entity comprising:
 a transceiver; and
 a controller configured to:
  receive, from a requesting network function (NF) entity in the serving PLMN via the transceiver, a first NF discovery request message comprising an identifier of a home PLMN, network slice assistance information, and a data network name,
  transmit, to a second NRF entity in the home PLMN via the transceiver, a second NF discovery request message comprising the network slice assistance information and the data network name, based on the identifier of the home PLMN, as a response to the second NF discovery request message, receive, from the second NRF entity via the transceiver, a first NF discovery response message comprising an address of a target NF in the home PLMN, and transmit, to the requesting NF entity via the transceiver, a second NF discovery response message comprising the address of the target NF.

5. The first NRF entity of claim 4, wherein the first NF discovery request message further comprises at least one of network slice instance information or a type of the target NF.

6. The first NRF entity of claim 4, wherein the second NF discovery response message further comprises network slice instance information associated with the target NF.

* * * * *